US008560653B2

(12) United States Patent
Herrod et al.

(10) Patent No.: US 8,560,653 B2
(45) Date of Patent: Oct. 15, 2013

(54) METHOD AND SYSTEM FOR OPERATING AN ENTERPRISE MANAGEMENT SYSTEM ON A MOBILE DEVICE

(75) Inventors: Allan Herrod, Mission Viejo, CA (US); Tajinder Maan, San Jose, CA (US); Paul Leon Della Maggiora, Durham, NC (US)

(73) Assignee: Symbol Technologies, Inc., Holtsville, NY (US)

( * ) Notice: Subject to any disclaimer, the term of this patent is extended or adjusted under 35 U.S.C. 154(b) by 580 days.

(21) Appl. No.: 11/671,572

(22) Filed: Feb. 6, 2007

(65) Prior Publication Data
US 2008/0189420 A1 Aug. 7, 2008

(51) Int. Cl.
*G06F 13/00* (2006.01)
(52) U.S. Cl.
USPC .......................................... 709/223
(58) Field of Classification Search
USPC ................................. 709/220–226
See application file for complete search history.

(56) References Cited

U.S. PATENT DOCUMENTS

| | | | |
|---|---|---|---|
| 2005/0088304 A1* | 4/2005 | Hines et al. ................. | 340/572.1 |
| 2006/0092037 A1* | 5/2006 | Neogi et al. ............. | 340/825.22 |
| 2006/0235955 A1* | 10/2006 | Chen et al. .................... | 709/223 |
| 2006/0235958 A1* | 10/2006 | Motoyama .................... | 709/223 |
| 2007/0180084 A1* | 8/2007 | Mohanty ........................ | 709/223 |
| 2007/0288611 A1* | 12/2007 | Serceki et al. ................ | 709/221 |
| 2007/0294385 A1* | 12/2007 | Kapadekar et al. ........... | 709/223 |
| 2008/0030308 A1* | 2/2008 | Johnson .................... | 340/286.02 |
| 2008/0034081 A1* | 2/2008 | Marshall et al. .............. | 709/223 |
| 2008/0059239 A1* | 3/2008 | Gerst et al. ........................ | 705/3 |
| 2008/0065753 A1* | 3/2008 | Rao ................................ | 709/223 |
| 2008/0109537 A1* | 5/2008 | Aune et al. .................... | 709/220 |
| 2008/0147831 A1* | 6/2008 | Redjaian et al. .............. | 709/222 |
| 2008/0155470 A1* | 6/2008 | Khedouri et al. ............. | 715/810 |

* cited by examiner

*Primary Examiner* — Robert B Harrell
(74) *Attorney, Agent, or Firm* — Randi L. Karpinia; Michael J. Giannetta

(57) ABSTRACT

Described are a method and system for mobilizing a management service platform. A connection between a mobile unit ("MU") and a mobile service platform ("MSP") appliance is established within an operating environment. A user of the MU is authenticated as an administrator. If the user is authenticated as the administrator, a mobile management interface ("MMI") is launched on the MU, thereby changing a status of the MU to a managing device. A management instruction is generated via the MMI of the MU serving as the management device. At least one other MU is managed in accordance with the management instruction.

23 Claims, 4 Drawing Sheets

Fig. 3

System 300

Fig. 4

System 400

METHOD AND SYSTEM FOR OPERATING AN ENTERPRISE MANAGEMENT SYSTEM ON A MOBILE DEVICE

BACKGROUND

The ability to locate and track assets in real time has become an important factor of any organization or industry. Wireless networking has emerged as an inexpensive technology for connecting numerous assets such as mobile computing devices with one another over a wireless coverage area of a network. A business enterprise may deploy a wireless network in order to provide wireless coverage throughout the operating environment of the enterprise. A wireless network offers the enterprise several benefits ranging from cost efficiency to flexibility in installation and scaling. However, while various wireless network architectures provide several mobile units with network connectivity, the wireless networks of the current art severely limit the effectiveness and the management operations available to an enterprise administrator. Specifically, the administrator is restricted to managing from a fixed location because he or she is unable to do so from a remote point of activity. Since enterprise management systems of the current art operate on a stationary computer, the administrator is prevented from performing any management operations when he is away from the stationary computer and at the remote point of activity. The remote point of activity may include any location within the operating environment in which the mobile units may perform actions and/or instructions. Thus, the administrator is unable to effectively interact with the mobile units deployed throughout the business enterprise if the administrator does not have access to the stationary enterprise management system.

An exemplary wireless network may be a wireless local area network ("WLAN") for providing radio communication between several devices using at least one wireless protocol. A wireless local area network may use radio frequency ("RF") communication channels to communicate between multiple mobile units ("MUs") and multiple stationary access points. The access points or access ports (both may be referred to herein as "APs") of the WLAN may be positioned in various locations of the environment to prevent any coverage gaps of the wireless coverage. In order to standardize the communications over a WLAN, the MUs may be equipped with wireless fidelity ("Wi-Fi") capabilities, such as compatibility with one or more of the various 802.11x standards (i.e., 802.11a, 802.11b, 802.11g, etc.). The 802.11 standards are a set of Wi-Fi standards established by the Institute of Electrical and Electronics Engineers ("IEEE") in order to govern systems for wireless networking transmissions.

SUMMARY OF THE INVENTION

The present invention relates to a method and system for mobilizing a management service platform. A connection between a mobile unit ("MU") and a mobile service platform ("MSP") appliance is established within an operating environment. A user of the MU is authenticated as an administrator. If the user is authenticated as the administrator, a mobile management interface ("MMI") is launched on the MU, thereby changing a status of the MU to a managing device. A management instruction is generated via the MMI of the MU serving as the management device. At least one other MU is managed in accordance with the management instruction.

DETAILED DESCRIPTION

The present invention may be further understood with reference to the following description of exemplary embodiments and the related appended drawings, wherein like elements are provided with the same reference numerals. The present invention is related to systems and methods used for enhancing the management operations of an enterprise within a communications network. Specifically, the present invention is related to systems and methods for mobilizing the capabilities of an enterprise management system in order to efficiently manage the information and software for a plurality of mobile units ("MUs") while providing an enterprise administrator (also referred herein as a "system administrator") with untethered management capabilities, that is, with portable management capabilities that the administrator may execute when he or she is at a point of activity, away from a fixed location (e.g., a fixed desktop at a company headquarters).

The enterprise management system may be a centralized management system for managing individual devices, such as, for example, the plurality of MUs, connected to a wireless network. The system may provide a series of services that allow a system administrator to both monitor and control the network, as well as the individual devices. An exemplary enterprise management system may be a mobility services platform ("MSP"). Certain management tasks may be preferably accomplished by accessing a MSP appliance via a fixed management interface ("FMI") running a general purpose computer, such as, for example, a desktop or laptop PC. These tasks may include input-sensitive operations (e.g., site setup) and viewing enterprise organization and layout (e.g., displaying charts and graphs). Furthermore, the FMI may be advantageous for importing/exporting files (e.g., creating sites from .CSV files), backing up and restoring an appliance, and updating the software on the appliance. While the FMI may continue to be useful when large displays and/or intensive data-entry are desired, the exemplary embodiment allows for management operations to be run independently and unattached from the FMI.

According to an exemplary embodiment of the present invention, a mobile management interface ("MMI") application is described that is capable of operating on at least one of the plurality of MUs. As will be described in further detail below, the MMI application may provide the MU with specific features to be used to enhance the usability of a fixed management console within the enterprise management system. The fixed management console, or MSP console, may run an FMI application via a web browser of a personal computer ("PC"). However, the MMI application may also allow the administrator using the MU to generate one or more management instructions, wherein at least one other MU may be managed according to the management instruction(s). The management instructions may allow the administrator to remotely perform each of the managerial functions available to the MSP console from one of the mobilized MUs. Thus, unlike the fixed MSP console, the MMI application permits the administrator to perform these managerial functions from any location throughout the operating environment, independent of the location of the fixed MSP console. Through the use of the management instructions, the administrator may perform such managerial function as, for example, tracking the location of the other MU(s), recording the performance of the other MU(s), retrieving diagnostic data from the other MU(s), retrieving business operation/inventory data from the other MU(s), providing software upgrades, modifying system configurations, encrypting security data, updating a device driver, reinstating/removing the other MU(s) into/from service, authenticating/disassociating the other MU(s) into/from the enterprise, etc. In addition, the MU may incorporate a variety of automatic identification ("auto-ID") input methods by mobilizing management appliance function, thereby enabling an administrator to perform management tasks from a remote location. Specifically, exemplary management features available to the MU may include, but are not limited to, biometric authentication, barcode scanning, imaging (i.e., photo capturing), radio frequency identification ("RFID") tracking, location awareness (i.e., real-time location systems ("RTLS")), and peer-to-peer communications (i.e., ad-hoc communications).

Figure 1:
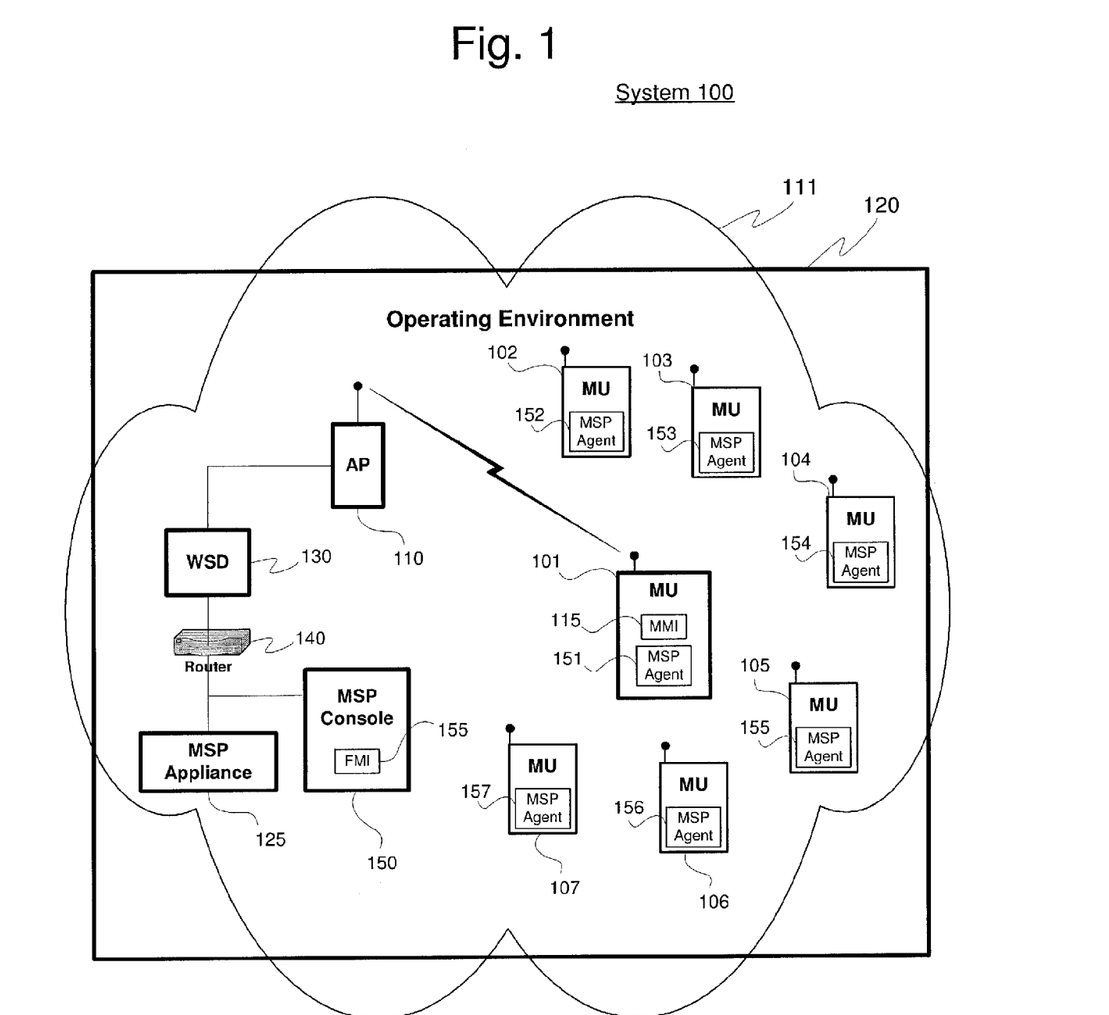
FIG. 1 shows an exemplary system for managing multiple network devices via a Mobile Management Interface ("MMI") application within an operating environment of an enterprise according to the present invention.

FIG. 1 shows an exemplary system 100 for managing multiple network devices via an MMI application 115 within an operating environment 120 of an enterprise. According to the exemplary embodiment, the MMI application 115 may run on a mobile computing device in order to access a MSP appliance 125 that may be located at a fixed, remote location. The exemplary MMI application 115 may be customized (i.e., thick client) based on the specific enterprise using the system 100. Those skilled in the art would understand that a thick client, or "client rich", application may perform the majority of any data processing and may not heavily rely on a remote server. An MU 101 provided with a thick client application can depend less on a remote server for processing capabilities, since much of those capabilities are performed by the thick client operating thought the MU 101. Thus, interruptions in wireless communications between the MU 101 and a remote server, such as MSP appliance 125, will be less disruptive of the MU 101.

As opposed to running a web-based application on the mobile computing device, a thick client application may not require continuous Internet connectivity and may also allow for greater flexibility in the operating system on the device. Furthermore, the thick client application may be customized to tightly integrate specific features of the mobile computing device (i.e., the MU 101) and to optimize a user interface ("UT") on the device. Different mobile computing devices may have specialized versions of the MMI application 115 to properly adapt to various device capabilities, such as, for example, input capabilities, screen sizes, etc. The MMI application 115 may also be designed for efficient operations under common mobile scenarios. For example, due to the fact that intermittent connectivity to the MSP appliance 125 may occur often, the MMI application 115 may cache any data (i.e., asset inventory information) so that the data may be distributed throughout any local devices on the network even when a connection to the MSP appliance 125 is unavailable. Therefore, such data may be downloaded independently of any tasks being performed by the UT and streamlined, and/or compressed, to reduce impact on network bandwidth.

Based on a variety of factors, the MMI application 115 loaded onto an MU 101 of an administrator may present a default UT to the administrator that is most likely to match the set of operations (i.e., management instructions) that are to be performed. For example, these factors may include the type of MU that runs the MMI application 115, location of the MU 101, any administrator preferences that have been previously established, etc. Accordingly, the administrator may adjust the UI of the MU 101 to conform the desired utility of the MMI application 115. The adjusted UI may then be saved onto a memory of the MU 101 as the default UI, and may be presented to the administrator during any subsequent uses of the MMI application 115 on that MU 101. Furthermore, the adjusted UI may be stored at the MSP appliance 125, and the MSP appliance 125 may transfer the adjusted UI to any other MU onto which the administrator has logged. Thus, the administrator may have a customized UI made available and presented on any of the MUs 101-107 according to the preferences of the administrator.

Since the display of a mobile device may be smaller than that of a desktop PC, the data of the UI may be mined for importance and then presented in a more concise and task-orientated manner. For example, the exemplary operating environment 120 may only have a few network devices. Accordingly, for the UI of the MU 101, it may be more effective to display each of the network devices over the UI by respective user names. Through the use of suitable menus, dropdown lists, or other suitable display information presentation techniques, the UI may enable a user to "drill down" into specific device detail when an icon, or other representation of the device that is displayed on the UT is selected via the UI by the administrator. Alternatively, the exemplary operating environment 120 may have numerous network devices. Accordingly, it may be more effective to group the devices, wherein the grouping criteria may be defined via a remote fixed management interface ("FMI"). The administrator may have the ability to "drill down" into each of the groups in order to gain greater detailed information concerning relevant devices within each group. By appropriately using the FMI and the MMI application 115 for the tasks each is best suited for, the overall usability of the system 100 may be greatly enhanced for the administrator.

The exemplary system 100 may include a plurality of MUs 101-107, an access point ("AP") 110, a wireless switching device ("WSD") 130, a router 140, and the MSP appliance 125, such as, for example, an enterprise management system. The exemplary system 100 may also include a MSP console 150. The MSP console 150 may be a UI presented on a fixed PC running a web browser. The MSP console 150 may include a FMI application 155 that is in communication with the MSP appliance 125. The FMI application 155 on the MSP console may be used to configure the MSP appliance 125. However, according to the exemplary system 100, the MMI appliance 115 may just as easily be used to configure the MSP appliance 125 either independently or in conjunction with the FMI application 155. Furthermore, the MMI application 115 may be used by the same or different administrators and may be used at the same time or at different times as the FMI application 155.

In addition, exemplary embodiments of the present invention may be implemented without regard to the specific type of network management system. In addition, the AP 110 and each of the MUs 101-107 may include MSP agents, 151-157. The MSP agent 151 may include software components provided with functionality for management of any MUs 101-107 within the MSP appliance 125. Each of the MSP agents 151-157 may reside on one of the MUs 101-107 that are managed as part of the MSP appliance 125. The MSP agent 151 may collect login and system information on the MU 101 and forward the information to the MSP appliance 125 via the MMI application 115. The login and system information may be used for authenticating the user of the MU 101 and for providing system information about the device, such as, the installed software on the MU 101, the system capabilities, the location, etc. The information collected by the MSP agent 151 may depend upon any number of factors, such as, for example, network device type (e.g., laptop, personal digital assistant ("PDA"), etc.), device functionality, system administrator preferences, etc.

The exemplary system 100 may utilize a wireless local area network ("WLAN") architecture 111 to provide continuous wireless coverage throughout an operating environment 120. Thus, the WLAN 111 may be described as a network infrastructure that allows for wireless devices, such as MUs 101-107, to be in communication with the AP 110 via radio waves. Those skilled in the art will understand that the WLAN 111 is only exemplary and that the present invention may be applied to any type of wireless network topology.

The operating environment 120 may be within a large establishment, such as, for example, a business office, a department store, a mall, a warehouse, a storage lot, an airport, a casino, a home, etc. The operating environment 120 may maintain the WLAN 111 in order to provide continuous wireless coverage throughout multiple areas of the establishment. MUs 101-107 may thus be deployed within this coverage to initiate communication with the AP 110 of the WLAN 111. Advantageously, the WLAN 111 may be set up within an establishment in an unobtrusive and inexpensive manner. Furthermore, the elimination of wires allows for the components of the WLAN 111 infrastructure to be placed in various locations and easily repositioned throughout the operating environment 120.

Each of the MUs 101-107 may include an antenna for communicating with the AP 110, as well as any of the other MUs within the WLAN 111. In addition, each of the MUs 101-107 may include a unique identification, such as, for example, an Internet Protocol ("IP") address or a Media Access Control ("MAC") address. According to the exemplary embodiments of the present invention, any one of the MUs, such as 101, may be provisioned with management capabilities by running the MMI application 115. The MU 101 may be provisioned with the MMI application 115 by the MSP appliance 125 whenever the user (i.e., an administrator) is authorized to provide management instructions. Specifically, the MU 101 may wirelessly download the MMI application 115 from the MSP appliance 125 via the AP 110. Alternatively, the MU 101 may download the MMI application 115 via a wired connected to either to the AP 110, or directly to the MSP appliance 125. As will be discussed in further detail below, the user may be determined to be an administrator based on any authentication information provided to the MSP appliance 125 by the user via the MU 101 (i.e., password data, biometric data, etc.).

Any MU within the operating environment 120 to potentially run the MMI application 115. In other words, the administrator of an operating environment may select any of the MUs 101-107 in the enterprise and log on to the selected MU in order to perform various managerial duties directly therefrom. Specifically, when the administrator provides any of the MUs 101-107 with proper authentication information, that MU may be automatically provisioned by the MSP appliance 125 with the appropriate MMI application 115. According to one exemplary embodiment of the present invention, the MMI application 115 may only be available to the MU that initially received authentication information that indicates the user of the MU is the administrator. This embodiment may also remove the MMI application 115 from the MU once the administrator logs off the device. Specifically, the MSP appliance 125 may transmit a delete command to the MU via the AP 110. The delete command may effectively remove the MMI application 115 from the MU in order to prevent any subsequent users of the MU from accessing the MMI application 115. Alternative embodiments may allow for multiple MUs to receive and run the MMI application 115. These alternate embodiments may allow for more than one administrator to manage the operating environment 120.

The login and system information collected by any of the MSP agents 151-157 may be communicated to the MSP appliance 125 via the MU 101 running the MMI application 115. The MMI application 115 may then manage the network of devices, as well as the entire WLAN 111, from the MU 101 using the login and system information provided by the MSP agents 151-157. The MMI application 115 on the MU 101 may manage the WLAN 111 based on a set of management policies that are provided within the MSP appliance 125, thereby allowing the administrator to maintain control of the network. The set of network policies may be downloaded to the MU 101 from the MSP appliance 125. Specifically, when the administrator needs to communicate with, or initiate a management action, on any of the network devices (i.e., MUs 102-107), the MMI application 115 on the MU 101 will first communicate with the MSP agent 151 of the device(s), and then communicate with the appropriate hardware and/or software component in the device(s) in order to cause a desired action.

Thus, each of the MSP agents 151-157 connected to the network devices, MUs 101-107, may facilitate the monitoring and management of these devices. Through these wireless agents, the MMI application 115 running on the MU 101 (and by extension, the system administrator) may receive important diagnostic data concerning each of the network devices, such as, for example, operational data related to functions of the enterprise.

Figure 2:
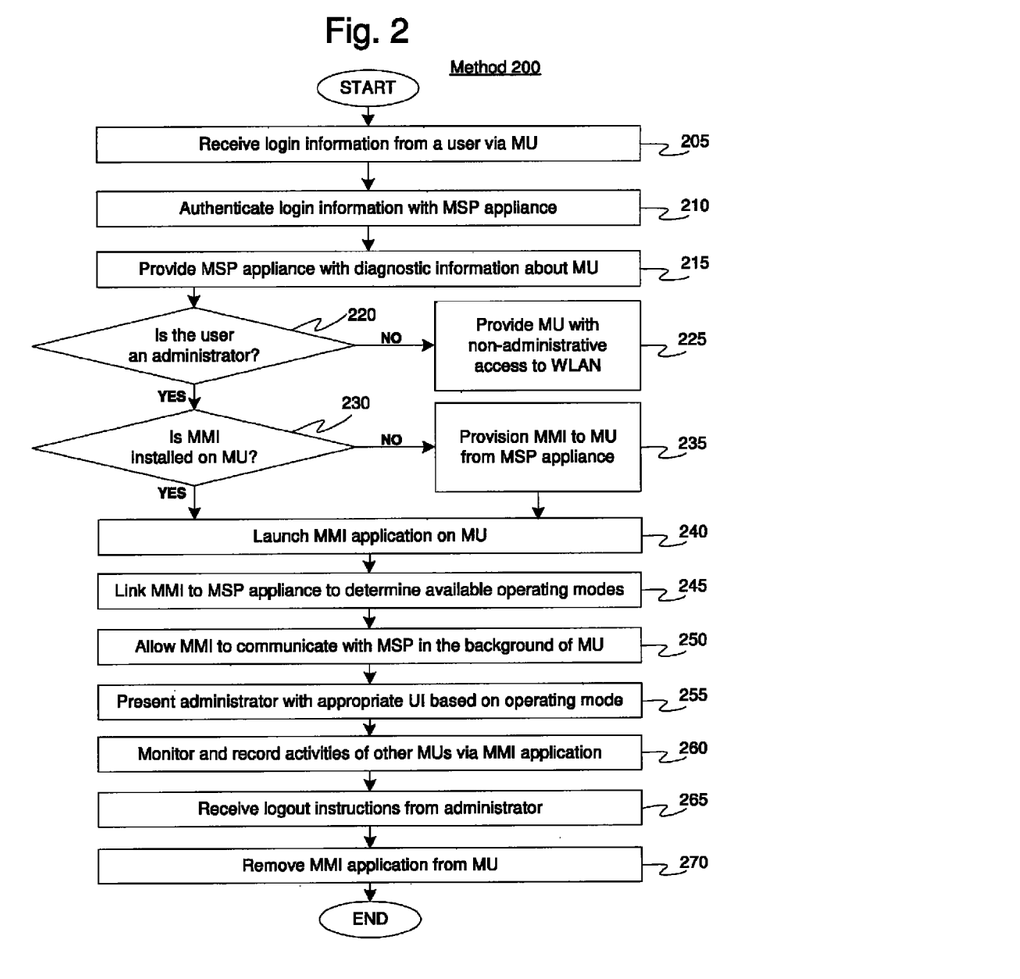
FIG. 2 shows an exemplary method for managing multiple network devices via an MMI application within an operating environment of an enterprise according to the present invention.

FIG. 2 represents an exemplary method 200 for managing multiple network devices via an MMI application within an operating environment of an enterprise according to the present invention. The exemplary method 200 will be described with reference to the exemplary system 100 of FIG. 1. Examples of the networking devices (i.e., MUs 101-107) may include laptop computers, voice over IP ("VoIP") telephone receivers, PDAs, portable barcode scanners, and any mobile computing devices. According to the present invention, each of the networking devices may include an MSP agent 151 for establishing and maintaining communication with the MSP appliance 125 over the WLAN 111. In addition, the method 200 may allow for one or more of the MUs 101-107 to monitor and manage each of the network devices throughout the WLAN 111 via the MU application 115. While the following method 200 will be described in reference to the MU 101 running the MMI application 115, those skilled in the art would understand that exemplary embodiments of the present invention may allow for any of the MUs 101-107, and/or multiple MUs, to run the MMI application 115 within the WLAN 111.

In step 205, the MU 101 may receive authentication information, such as, for example, login information, from the administrator of the operating environment 120. The authentication information may allow the administrator to log into the MU 101. Examples of authentication information, or credentials, may include user ID and password information, biometric information, a digital or physical key, etc. According to an exemplary embodiment of the present invention, the MSP appliance 125 may provide the ability to pass a login authentication request to a corporate Active Directory, or a Lightweight Directory Access Protocol ("LDAP") server. Therefore, the MMI application 115 may fit into a corporate "single login" initiative. Thus, once the MSP appliance 125 has successfully authenticated the administrator, the credentials may be cached locally at the MU 101 in order to permit a subsequent login by the administrator even when a connection to the WLAN 111 is not available.

In step 210, the MSP agent 151 of the MU 101 may authenticate the login information received from the administrator with the MSP appliance 125. If the MSP agent 151 of the MU 101 fails to authenticate the login information, the MSP appliance 125 may deny network access to the MU 101. Upon being authenticated by the MSP appliance 125, the MU 101 may become a managed device within the WLAN 111 of the enterprise.

In step 215, the MSP agent 151 of the authenticated MU 101 may provide the MSP appliance 125 with diagnostic information about the MU 101, such as, for example, the software installed, the capabilities, the location, etc. Following the provision of the diagnostic information, in step 220, the MSP appliance 125 may then determine whether the login information indicated that the user of the MU 101 is the administrator. If the MSP appliance 125 determines that the user of the MU 101 is not an administrator, the method 200 may proceed to step 225 wherein the MU 101 is provided with access to the WLAN 111 but denied any management capabilities. If the login information authenticates the user as the administrator, then the method may proceed to step 230.

In step 230, a determination may be made from the received diagnostic information as to whether the MU 101 has the MMI application 115 installed onto the device. If the MU 101 does not have the MMU application 115, the MSP appliance 125 may provision, via AP 110, the MU 101 with the MMI application 115 for installation in step 235. Once the MU 101 has installed the MMI application 115, the MU 101 may become MMI-enabled and the method 200 may proceed to step 240.

In step 240, the MU 101 may receive instructions from the administrator to launch the MMI application 115 over the MU 101. When launching the MMI application 115, the administrator may be asked to resubmit authentication information. In the event the administrator has been separated from the MU 101 (i.e., misplaced the MU 101, stepped away from the MU 101), the resubmission of authentication information may ensure that the user of the MU 101 is still the administrator of the network.

In step 245, the MMI application 115 of the MU 101 may link to the MSP appliance 125. Once the MU 101 is linked, the MSP appliance 125 may determine any available operating modes of the MU 101. If multiple options exist, the MU 101 may present the administrator with a menu over the display of MU 101 to allow the desired operating mode to be selected. An exemplary operating mode may be an observation mode. During the observation mode, the MMI application 115 may view and monitor the movement and activity of any of the network devices (i.e., MUs 101-107) throughout the operating environment 120. The observation mode may be performed over the MU 101 to ensure the quality of service provided by each the network device and the users of each network device. A further exemplary operating mode may be system configuration mode. During the system configuration mode, the MMI application 115 may allow the MU 101 to wirelessly communicate with any of the network devices and reconfigure the devices for resolving any problems and/or for improving the overall operation of the network. A further exemplary operating mode may be software distribution mode. During the software distribution mode, the MMI application 115 may allow the MU 101 to transmit the latest versions, updates, and patches of software to any of the network devices (i.e., MUs 102-107) within the enterprise. Those skilled in art would understand that the operating modes serve as examples of the diverse functions in which the MMI application 115 may be applied, and the exemplary operating modes do not in any way serve to limit the number of further functions that may be performed by additional embodiments of the present invention.

In step 250, the MMI application 115 running on the MU 101 may communicate with the MSP appliance 125 in the background of the MU 101, obtaining, caching, and refreshing any management information that may be needed for the one or more modes supported by the MMI application 115. As described above, the MMI application 115 running on the MU 101 may serve as either an alternative or a complement to the FMI application 155 running on the MSP console 150. Accordingly, either the MMI application 115 alone, or in conjunction with the FMI application 155, may be used to configure the MSP application 125 to collect data. While the MMI application 115 may maintain a wireless communication link with the MSP appliance 125, this link does not need to be a continuous link. As described above, the MMI application 115 may have limited or intermittent access to the MSP appliance 125. Thus, the MMI application 115 may only need to periodically establish a communication link with the MSP appliance 125 while running in the background of the MU 101. The frequency of establishing this communication link may depend on several factors, such as, the location of the MU 101, the management actions performed at the MU 101, the mode of operation of the MMI application 115, etc. Furthermore, the MMI application 115 on the MU 101 may provide the administrator with information pertaining to any of the other devices (MU 102-107) within the WLAN 111 under the management of the administrator. The management information used by the MMI application 115 to perform various management functions may come from a central repository within the MSP appliance 125. Depending on the nature of the problems to be addressed by the administrator, the MSP appliance 125 may be configured by the MMI application 115 to collect additional data from any of the devices (i.e., MUs 101-107) or to collect the data at more frequent intervals. The collected data from the MUs 101-107 may include information received from data capturing components, global position systems ("GPS"), advanced "auto-ID" components, etc. The design of the MMI application 115 may make it easy to configure by providing pre-defined profiles that can be applied to each of the devices (MU 101-107) within the management domain of the MMI application 115.

In step 255, the MMI application 115 may present an appropriate UI to the administrator based on the operating mode of the MU 101. The appropriate UI may present the administrator with the cached management information and may allow for mode-specific interactions with each of the managed devices (MUs 101-107) via the MMI application 115 on the MU 101. As described above, the administrator may customize the UI that is presented on the MU 101 and may save the customized UI locally on the MU 101 and/or globally on the MSP appliance 125.

In step 260, the MMI application 115 on MU 101 may continue to communicate with the MSP appliance 125 while monitoring the activities of the MUs 102-107 and while generating management instructions in response, for instance, to a command entered by the administrator. As the administrator provides instructions to the MMI application, the MSP appliance 125 may exchange information with the MMI application 115 over the established communication link. By utilizing the unique capabilities of the MU 101 (i.e., data capture, GPS, other auto-ID capabilities, etc.) in combination with the MMI application 115 on the MU 101, the administrator is able to perform management tasks at the point of activity in an enterprise because MMI application 115 generates management instructions that enable the management tasks. Thus, the exemplary method 200 of the present invention may create new opportunities and utilities for the MSP management products (i.e., MSP appliance 125), as well as additional utilities for the MUs 101-107 by allowing the MU 101 to run the MMI application 115.

In step 265, the MU 101 may receive an instruction to logout the administrator via a logout command. The logout command may be initiated by the administrator via the UI of the MU 101 and/or via the MSP appliance 125. Furthermore, the logout command may be initiated following a designated time period of inactivity of the MU 101. In other words, if the MU 101 remains idle or unused for a set duration of time, the MU 101 may automatically logout (e.g., "time-out") the administrator from the device. The lack of activity on the MU 101 may indicate that the administrator has stepped away from MU 101, and the automatic logout may serve as a security measure to prevent any non-administrators from gaining inappropriate access to the MMI application 115 on the MU 101. Additionally or alternatively, the expiration of a set duration of time may automatically instruct the MU 101 to shut itself down. The automatic shut down may serve as an energy saving measure to preserve the battery life of a power source within the MU 101.

According to an exemplary embodiment of the present invention, method 200 may continue onto step 270 upon receiving the logout command from the administrator. In step 270, the MU 101 may automatically remove (e.g., delete) the MMI application 115 from the memory of the MU 101. Alternatively, the MU 101 may present the administrator with an option to remove the MMI application 115 from the MU 101 following the logout command. This may be helpful if the administrator frequently exchanges the use of the MMI application 115 between multiple MUs 101-107 throughout the operating environment 120. Furthermore, deleting the MMI application 115 further prevents non-administrators from having access to an MU that contains the MMI application 115.

According to the exemplary embodiment of the present invention, the MMI application 115 may allow the administrator to perform on-site management functions, such as, for example, track multiple computing devices and troubleshoot any problems related to mobile computing and the network. These functions may often be very manual processes; thus it would be advantageous to have the administrator away from the MSP console 150 and present at the point of activity. The MMI application 115 may allow the MU 101 of the administrator to effectively capture data related to the operations of the enterprise and quickly resolve any issues. The MMI application 115 may empower a single administrator to perform managerial functions more efficiently via the management instructions, or alternatively, may allow multiple regional administrators to work in conjunction with a centralize enterprise administrator. Thus, the operation of the MMI application 115 on a mobile computing device, such as MU 101, provides the administrator with the freedom of managing the network devices of the enterprise from any location within the operating environment 120.

As referenced above, alternative embodiments of the present invention may include the MU 101 having a biometric reader. When the administrator needs to authenticate the MU 101 with the MSP appliance 125, the biometric reader may be used to increase the security of the authentication process, as well as simplifying the authentication process. As the ability to perform the management functions of the enterprise becomes mobilized, security becomes a greater concern. Thus, the MU 101 may include additional security measures to ensure that an unauthorized user (i.e., a non-administrator, an intruder, etc.) does not gain access to the management functions of the enterprise via the MU 101. The additional security measures for the MU 101 may include, but are not limited to, fingerprint detection, eye retinal scanning, facial pattern identification, hand measurements, signature capture, voice analysis, etc.

Figure 3:
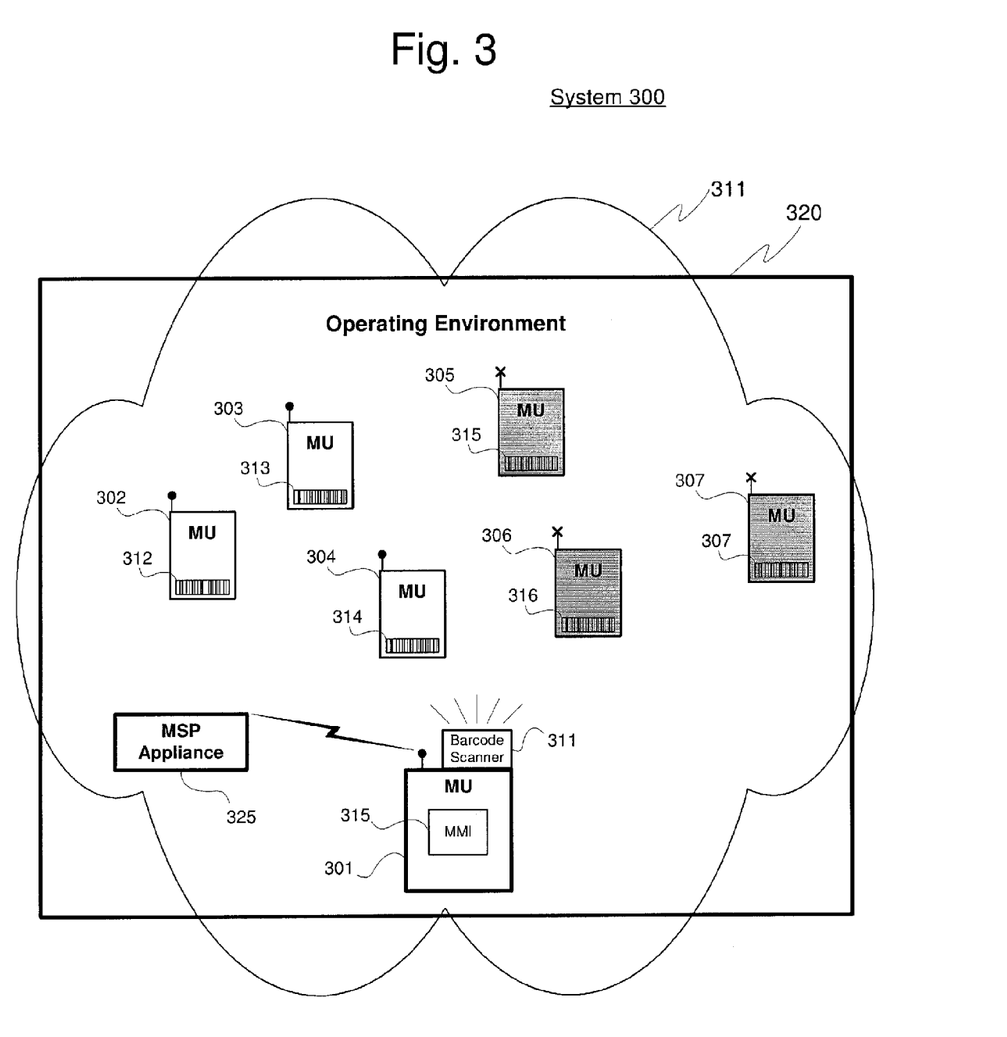
FIG. 3 shows an exemplary system for authenticating the MUs via an MMI application within an operating environment of an enterprise according to the present invention.

FIG. 3 shows an exemplary system 300 according to another exemplary embodiment of the present invention for authenticating MUs 302-307 throughout an operating environment 320. In other words, the exemplary system 300 allows the administrator to perform the managerial functions associated with device authentication and device disassociation within the operating environment 320. Specifically, as each of the MUs 302-307 enters the operating environment 320, an MU 301 running the MMI application 315 may individually authenticate the MUs 302-307. As opposed to allowing any of the MUs 302-307 or a foreign MU to gain access to a WLAN 311, system 300 may restrict WLAN access to any unauthorized device. Using a fixed console, it would be cumbersome for the administrator to perform the management instructions required for individually authorizing access to each device.

According to the exemplary system 300, each of the MUs 302-307 may include unique auto-ID data, such as, for example, barcodes 312-317. The MU 301 may include an auto-ID data reader, such as, for example, barcode scanner 311. The barcodes 312-317 may contain transferable information in which the MU 301 may use to identify the MUs 302-307. The use of a mobile management console, such as the MU 301, allows the administrator to authorize WLAN access to any device simply by reading the auto-ID data on the device and communicating with a MSP appliance 325. Those skilled in the art would understand that the use of the barcodes 312-317 and the barcode scanner 311 is only one example of a way for authenticating assets within the operating environment 320. The MU 301 may include other auto-ID data readers to authenticate the MUs 302-307 throughout the operating environment 320. Furthermore, while the exemplary system 300 shows six MUs 302-307 and one MU 301, any number of MUs may be located within the system 300 and any number of MUs may run the MMI application 315. Moreover, for those situations in which a device other than MU 301 is executing the MMI application 315, the MUs 302-307 may each be equipped with barcode scanner 311 and MU 301 may include a barcode.

For example, the WLAN 311 would have greater security if each new device had to be authorized before the device is provided with access to the WLAN 311. Therefore, according to this example, the system 300 may deny access to the WLAN 311 to all devices until the administrator authorizes the device. Accordingly, the administrator may want to provide WLAN access to the MUs 302, 303 and 304. The administrator may use the barcode scanner 320 of the MU 301 to scan the respective barcodes 312, 313 and 314 of the authorized devices. The MU 301 may then communicate with the MSP appliance 325, providing the identification data contained on the barcodes 312, 313 and 314. The MSP appliance 325 may process this data and authorize WLAN access to these MUs 302, 303, and 304. Thus, MUs 302, 303 and 304 may communicate over the WLAN 311, while the unauthorized MUs 305, 306 and 307 are denied WLAN access.

While a fixed management console would have required every new device to be brought to the location of the fixed console for authorization, the mobile management console according to the exemplary embodiments of the present invention allows for the administrator to mobilize the authentication process. By mobilizing the authentication process, and thereby removing its execution away from the fixed console location, the system 300 greatly improves the efficiency of controlling access to the WLAN 311, and thus, provides much greater security to the system 300.

According to an additional embodiment of the system 300, the MMI application 315 running on MU 301 may provide further management abilities, such as for example, removing specific devices from service. For example, if MU 307 is damaged and in need of servicing, the MSP appliance 325 should be made aware of the change of status and record as much information as possible about the circumstances. Similar to the authentication process described above, the use of a fixed management console would greatly inhibit the capabilities of the administrator. As opposed to taking the damaged MU 307 to the fixed console, the administrator using the MU 301 may gather information about the MU 307 and the condition of the MU 307 at the point of activity.

By using the barcode scanner 320 of the MU 301, the administrator may simply scan the barcode 317 to initiate the removal process. The UI of the MU 301 may prompt the administrator with the option to remove the damaged MU 307 from service, thereby notifying the MSP appliance 325 and making record of the situation. The removal from service may also deny WLAN access to the MU 307. In additional, the MU 301 may be equipped with an imaging device, such as a digital camera, in order to allow the administrator to take photographs of the MU 307 and the degree/type of damage. Furthermore, if the damaged MU 307 is being shipped out for repair/servicing, the barcode scanner 320 of the MU 101 may be used to receiving shipping information for the damaged MU 307 from a shipment barcode. The MMI application 315 may process the shipping information for tracking purposes.

If the MU 307 has been repaired, the administrator may scan the barcode 317 and select an option to return the MU 307 to service. Returning the MU 307 to service informs the MSP appliance 325 that the MU 307 has been repaired and the administrator wants to resume WLAN access to the MU 307. However, the damaged MU 307 may be replaced with a new MU. According to one embodiment, the new MU may be provided with the same identification data (e.g., the barcode 317) as the damaged MU 307. If the identification data is the same, the MU 301 may recognize the new MU automatically upon reading the data. Alternatively, the new MU may have different identification data from the MU 307. The MU 301 may then authenticate the new MU to the MSP appliance 325 as described above. Once the new MU has been authenticated, the administrator may designate the new MU as the replacement to MU 307.

According to a further embodiment of the present invention, the MMI 315 may be used as an MU activity diagnostic tool. The MU 301 running the MMI 315 may scan the barcodes 312-317 of the MUs 302-307 in order to identify diagnostic information such as, for example, device serial number, the name of the most recent user, any known problems, software inventory, network connectivity, roaming trends, current network connectivity CPU status, memory status, application information, etc. Thus, the administrator may be provided with such diagnostic information on demand, at the point where the MU is located. Accordingly, this exemplary embodiment of the present invention greatly improves the efficiency and the management capabilities of the administrator. In addition, the MU 301 may capture additional information about an MU that may be affixed to the MU in the form of a customer-added barcode, RFID tag, etc. The additional information may then be provided to the MSP console via the MMI application 315 in order to correlate any customer-specific data with known information, such as the serial number printed on the MU.

Figure 4:
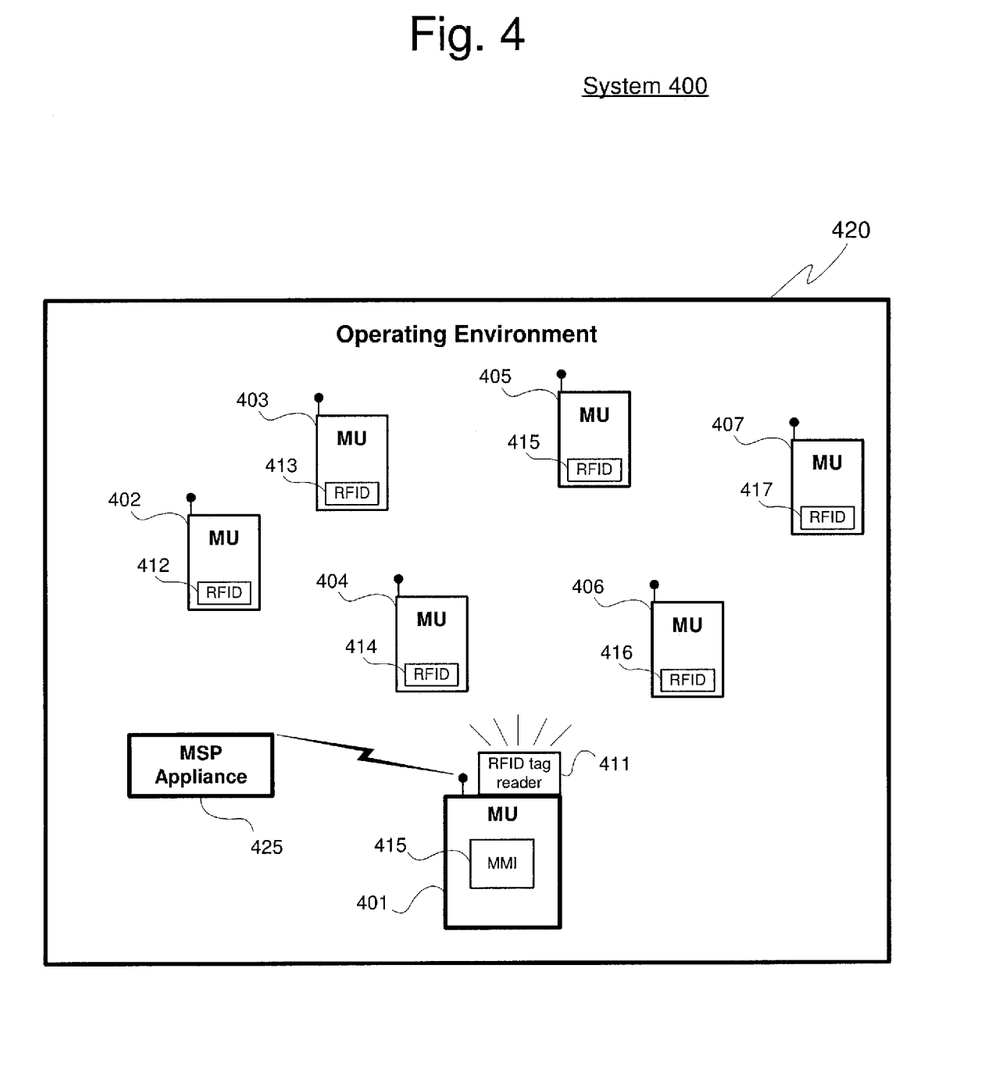
FIG. 4 shows an exemplary system for tracking the locations of the MUs via an MMI application within an operating environment of an enterprise according to the present invention.

FIG. 4 shows an exemplary system 400 according to another exemplary embodiment of the present invention for tracking the locations of MUs 402-407 throughout an operating environment 420. In other words, the exemplary system 400 allows the administrator to perform the managerial functions associated with device tracking within the operating environment 320. Specifically, each of the MUs 402-407 may include a location tracking tag, such as, for example, RFID tags 412-417, respectively. In addition, an MU 401 running an MMI application 415 may communicate with a MSP appliance 425 in order to individually track the location of the RFID tags 412-417 using a tracking device, such as, for example, RFID tag reader 411. Thus, system 400 may allow for the administrator to mobilize the tracking of assets from the MU 401. The use of a fixed console to provide the management instructions required for tracking the assets would be cumbersome and limit the ability of the administrator to perform such managerial duties. Those skilled in the art would understand that the use of the RFID tags 412-417 and the RFID tag reader 411 is only one example of a means for tracking assets within the operating environment 420. The MU 401 may include other asset tracking devices, such as, for example, a GPS tracking device, to track the locations of the MUs 402-407 throughout the operating environment 420. Furthermore, those skilled in the art would also understand that while the exemplary system 400 shows six MUs 402-407 and one MU 401, any number of MUs may be located within the system 400 and any number of MUs may run the MMI application 415.

According to the exemplary system 400, the MMI appliance 415 running on the MU 401 may take advantage of the RFID tag reader 411 in order to identify each of the MU 402-407 in proximity to the MU 401. This may enhance the management capabilities by allowing the administrator to focus his attention on the devices within the immediate vicinity of the MU 401. Furthermore, the RFID tag reader 411 may provide the administrator with the freedom to move about the operating environment 420, examine specific location within the operating environment 420, locate any misplaced devices, provide asset inventory information, etc. from the MU 401. Even in the event that one of the MU 402-407 is not functioning, the RFID tag 412-417 on the device may still allow for the location of the non-functioning MU to be determined by the RFID tag reader 411. Moreover, for those situations in which a device other than MU 401 is executing the MMI application 415, the MUs 402-407 may each be equipped with RFID tag reader 411, and the MU 401 may include an RFID tag.

Furthermore, the administrator may use the system 400 to locate areas within the operating environment 420 that are experiencing a problem or an emergency. Specifically, a user of one of the MUs 402-407 may trigger an alert, such as an emergency signal or a problem notification, to the MMI application 415 and/or to the MSP appliance 425. The alert may be transmitted from any of the MUs 402-407 directly to the MU 401 running the MMI application 415, and the alert may include user-entered information such as the type of problem and the degree of problem. Advantageously, through the use of the RFID tags 412-417 and the RFID tag reader 411, the exemplary system 400 may allow the administrator to determine the precise location of the MU that generated the alert. One of the MUs 402-407 and/or the MMI application 415 may directly transmit the alert to the MSP appliance 425. When the MMI application 415 receives the alert, the administrator may be provided with relevant MU location information, problem descriptions, and any further information to allow the administrator to diagnose and troubleshoot the problem. Thus, the administrator may use the facilities provided by the MMI application 415 to evaluate the urgency of the alert and the need for response in order to address and resolve the problem in an efficient manner.

Furthermore, similar to the exemplary system 300, the exemplary system 400 may use the RFID tags 402-407 to track device inventory through the MMI application 415. The RFID tag reader 411 of MU 401 may collect inventory information such as, for example, which devices are out for repair, which devices have been recently returned into service, which devices are actively in use, etc. For example, the system 400 may allow the administrator to gather or "pool" all of the devices within the operating environment 420, within a sector of the operating environment 420, or within multiple operating environments and perform periodic (i.e., quarterly, annually, etc) inventory checks of the devices located in area. In the event that numerous devices are pooled from multiple operating environments, the system 400 may allow the administrator to return each device to its proper operating environment. This may be useful when the administrator needs to perform a device inventory check on multiple stores or warehouse. The use of the RFID tags 402-407 with the MMI application 415 may ensure that each device is sent back to its original store or warehouse, thereby helping the administrator easily manage the pooling and distribution of the device.

According to an alternative embodiment of the present invention with reference to the exemplary system 100 of FIG. 1, the MU 101 running the MMI application 115 may also automatically adapt to the operating environment 120 in which it is located. Therefore, the MU 101 may present an administrator with a localized management view of the operating environment 120. According to this embodiment, the MU 101 is already a known component to the infrastructure devices (i.e., APs, the MSP appliance 125, other MUs, etc.) within the operating environment 120. Once the MMI application 115 is launched on to the MU 101, the MU 101 becomes the mobile management device. Therefore, the MMI application 115 may be useful wherein the administrator of the operating environment 120 is responsible for the management of every MU within the operating environment 120. In addition, it may also be adaptable to help visiting support staff to also manage the MUs 101-107 of the operating environment 120. A fixed management console would severely limit the ability of the administrator/support staff to monitor the MUs at their respective points of activity. However, since the adaptable MMI application 115 may run on any of the MUs 101-107, the administrator/support staff may investigate the performance of each MU 101-107 at every point of activity within the operating environment 120.

According to a further alternative embodiment of the present invention with reference to the exemplary system 100 of FIG. 1, the MU 101 running the MMI application 115 may also act as a proxy to a provisioning server to each of the other MUs 102-107 within the operating environment 120. Within a system using a fixed management console, each of the MUs 102-107 must connect either directly to the fixed management console or to a separate provisioning server. However, according to this alternative embodiment of the present invention, the MMI application 115 may allow the administrator to stage and provision the other MUs 102-107 of the operating environment 120, thereby defining infrastructure configurations based on the requirements of the WLAN 111.

This embodiment may be useful when, for example, a link between the MUs 102-107 and the MSP appliance 125, or a separate provision server, is down, out of range, overloaded, or otherwise unavailable. Another example would be when one of the MUs 102-107 needs to be re-provisioned in the field following a catastrophic failure of the system 100. A further example would be when a security scheme in place at the operating environment 120 is not supported by a version of software that is pre-loaded onto one of the MUs 102-107. Accordingly, the MU 102-107 may establish a local communication link, such as a peer-to-peer link, with the MU 101 running the MMI application 115 in order to stage and provision the MU. If the MU 101 has an existing connection to the MSP appliance 125 or the separate provisioning server, the MU 101 may then act as a proxy and allow the staging and/or provisioning to occur from the MU. Alternatively, if the MU 101 does not have an existing connection to the MSP appliance 125 or the separate provisioning server, but may establish a connection at a later time, the MU 101 may store the information for staging and/or provisioning the MUs 102-107 and transmit the information to the MSP appliance 125 or the separate provisioning server once a connection is established.

According to another alternative embodiment of the present invention with reference to the exemplary system 100 of FIG. 1, the administrator of an operating environment may use the MMI application 115 running on the MU 101 to track the productivity of the users (i.e., employees) as they perform repetitive tasks with the MUs 102-107. These repetitive tasks may include such tasks as scanning parcels, tracking goods, stocking inventory, etc. Each of the MUs 102-107 in use may be tracked be the MMI application 115 through such observable activities such as, for example, the number of barcode scans performed by the MUs 102-107, the duration of time between scans, the time of operation of the MUs 102-107, the tracked movement of the MUs 102-107 throughout the operating environment 120, etc. Thus, by using the MMI application 115, the administrator may spot check any of the MUs 102-107 and quickly assess the performance of the user using that MU 101.

According to a further alternative embodiment of the present invention, the MMI application 101 may assist the MSP appliance 125 in establishing and maintaining an infrastructure within an operating environment. Specifically, the MMI application 115 may improve the integration of infrastructure tools such as, for example, site planning tools, site surveying tools, intrusion protection tools, etc. For example, if there exists an 802.11b coverage gap within an exemplary WLAN 111, the MMI application 115 may be used to remotely identify the location of the coverage gap. Furthermore, the MMI application 115 may determine the nature of the coverage gap by collecting and reporting relevant information, such as signal strength, in a real-time manner. The MMI application 115 may utilize an antenna assemble on the MU 101 running the MMI application 115 to collect the information. The collected information may be processed by the MMI application 115, or alternatively, the information may be forwarded to the MSP appliance 125 for processing.

Furthermore, the MMI application 115 may allow for the identification of an unauthorized, or rogue, AP or a rouge MU within the operating environment 120. The MMI application 115 may be used on the MU 101 to remotely investigate any potentially offending devices. The MMI application 115 may interrogate the device, record the location of the device, or simply scan any auto-ID data (i.e., barcodes) on the device in order to determine whether the AP or MU being investigated is a known resource or is actually an unknown rogue device. Accordingly, if the MU 101 running the MMI application 115 includes an imaging device, the MU 101 may take a photograph of the rouge device and its surroundings to provide additional information for assessing any risk associated with the rogue device.

According to an exemplary embodiment for determining a rogue MU, the MMI application 115 may continuously verify the operation and location of each of the MUs 102-107 within the operating environment. Specifically, the MMI application 115 may keep each of the MUs 102-107 in synchronization with the MMI application 115 and a known AP 110 within the operating environment 120. For example, each of the MUs 102-107 may periodically transmit a beacon signal, in addition to respective location coordinates, to the AP 110. The beacon signal, along with the respective location coordinates, may be forwarded from the AP 110 to the MMI application 115 and/or the MSP appliance 125 for processing, wherein the MMI application 115 may acknowledge the operation and location for each of the MUs 102-107.

In the event that one or more of the MUs 102-107 fails to transmit a beacon signal for a designated period of time, that MU may be denied access to the AP 110. In other words, the MMI application 115 may transmit the identifying information related to any disassociated MU to the AP 110, and the AP 110 may then cease any communication with an MU that provides such identifying information.

Furthermore, if the disassociated MU attempts to re-initiate communications with the AP 110, the AP 110 may transmit a security alert to the MMI application 115 and/or the MSP appliance 125. Due to the fact that the disassociated MU failed to transmit the periodic beacon signal within a certain time frame, it may be assumed that the disassociated MU may have been stolen or tempered with, or alternatively, an unauthorized device is replicating the operations of the MU. Thus, the security alert from the AP 110 to the MMI application 115 and/or to the MSP appliance 125 may be appropriate. Once the disassociated MU has been detained, a determination may be made as to whether the disassociated MU may reinitiate operations within the operating environment. The identity of the disassociated MU may be re-authenticated by the MMI application 115, and MU may return to securely communicate with the AP 110.

According the above described exemplary embodiments of the present invention, the management instructions may describe any activity that allows the administrator to perform managerial functions, such as, for example, track location and performance of the MU(s), retrieve diagnostic data from MU(s), retrieve business operation/inventory data from MU(s), provide software upgrades, modify system configurations, encrypt security data, update device drivers, remove and reinstate MU(s) from service, authenticate and disassociate MU(s) from the enterprise, etc. Furthermore, as described in detail above, the management instructions may allow the administrator to remotely perform each of the functions available to the fixed MSP console from one of the mobilized MUs.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method of managing a plurality of mobile computing units (MU) within a mobile device management (MDM) system, comprising:
    establishing a connection between a MU and the MDM system, the MDM system managing the MU and including a plurality of management instructions within an operating environment;
    detecting, by the MDM system, that the MU is incapable of operating as a managing MU because it lacks a mobile management interface (MMI);
    authenticating a user of the MU as an administrator authorized to perform the plurality of management instructions;
    deploying, by the MDM system, the MMI to the MU when the user is authenticated as the administrator, thereby changing a status of the MU to a managing MU, wherein the MMI application executing on the managing MU communicates with the MDM system to gain access to the plurality of management instructions;
    presenting, via the MMI on the managing MU, information obtained from the MDM system, regarding at least one other MU in the plurality of MUs;
    receiving, by the MDM system, a management instruction indicating a management operation that the user wishes to perform from the MMI on the managing MU;
    performing, by the managing MU, the requested management instruction; and
    displaying, on the managing MU, results of the requested management operation.

2. The method according to claim 1, further comprising:
    causing, via the MMI application, the MU serving as the managing device to identify the at least one additional MU; and
    causing, via the MMI application, the MU serving as the managing device to track and record an activity of the at least one additional MU.

3. The method according to claim 2, wherein the at least one additional MU is identified based on a unique automatic identification ("auto-id") data.

4. The method according to claim 3, wherein the unique auto-id data is one of a barcode, a capturable image, a radio frequency identification ("RFID") tracking tag, an optical character recognition ("OCR") symbol, a smart card, an integrated circuit card, a magnetic stripe, biometric authentication data, and voice recognition data.

5. The method according to claim 1, further comprising:
    determining a number of operating modes that exist on the MU; and
    providing the user of the MU serving as the managing device with a menu of selectable operating modes via the MMI application.

6. The method according to claim 1, further comprising:
    determining whether the MU is enabled with the MMI application; and
    providing the MU with the MMI application if the MU is not enabled with the MMI application.

7. The method according to claim 1, further comprising:
    transmitting to the at least one additional MU data generated via the MMI application in order to modify a feature of the at least one additional MU.

8. The method according to claim 7, wherein the data transmitted is one of data for a software upgrade, data for modifying a system configuration, encrypted security data, business operation data, and data for updating a device driver.

9. The method according to claim 1, further comprising:
transmitting diagnostic data about at least one of the MUs from the managing MU to the MDM system.

10. The method according to claim 6, further comprising:
adjusting a display of a user interface ("UI") of the MMI application based on a selected operating mode in order to show cached data and allow for mode-specific interactions between the user and the MU.

11. The method according to claim 1, further comprising:
receiving a logout command from the administrator;
logging the administrator out of the MU serving as the managing device; and
removing the MMI application from the MU, so that the MU serving as the managing device no longer serves as such.

12. The method according to claim 1, wherein the MU is one of a barcode scanner, an image capturing device, a radio frequency identification tracker, an optical character recognition device, a smart card reader, an integrated circuit card reader, a magnetic stripe reader, a biometric authentication device, and a voice recognition device.

13. A system, comprising:
a mobile device management (MDM) system including a plurality of management instructions, the MDM system connected to an access point ("AP") providing network coverage for an operating environment;
a mobile computing unit (MU), the MU being managed by the MDM system and receiving a mobile management interface (MMI) application from the MDM system when a user of the MU is authenticated as an administrator authorized to perform the plurality of management instructions, thereby changing a status of the MU to a managing MU, the MMI application executing on the managing MU communicating with the MDM system in order to gain access to the plurality of management instructions; and
at least one managed MU in communication with the managing MU, the managing MU performing a management instruction from the MMI application on the at least one managed MU and displaying results of the management operation.

14. The system according to claim 13, wherein the MMI application causes the managing MU to identify the at least one managed MU, and the MMI application further causes the managing MU to track and record an activity of the at least one managed MU.

15. The system according to claim 14, wherein the at least one managed MU is identified based on a unique automatic identification ("auto-id") data.

16. The system according to claim 15, wherein the unique auto id data is one of a barcode, a capturable image, a radio frequency identification ("RFID") tracking tag, an optical character recognition ("OCR") symbol, a smart card, an integrated circuit card, a magnetic stripe, biometric authentication data, and voice recognition data.

17. The system according to claim 13, wherein the MDM system transmits to the at least one managed MU data generated via the MMI application in order to modify a feature of the at least one managed MU.

18. The system according to claim 17, wherein the data transmitted is one of data for a software upgrade, data for modifying a system configuration, encrypted security data, business operation data, and data for updating a device driver.

19. The system according to claim 13, wherein the managing MU transmits diagnostic data about the at least one managed MU to the MDM system.

20. The system according to claim 13, wherein the MDM system determines whether the managing MU is enabled with the MMI application and provides the managing MU with the MMI application if the managing MU is not enabled with the MMI application.

21. The system according to claim 13, further comprising:
a user interface ("UI") of the MMI application based on a selected operating mode showing cached data and allowing for mode-specific interactions between the administrator and the managing MU.

22. The system according to claim 13, wherein the MDM system receives a logout command from the administrator, logs the administrator out of the managing MU, and removes the MMI application from the MU, so that the managing MU no longer serves as such.

23. The system according to claim 13, wherein the managing MU is one of a barcode scanner, an image capturing device, a radio frequency identification tracker, an optical character recognition device, a smart card reader, an integrated circuit card reader, a magnetic stripe reader, a biometric authentication device, and a voice recognition device.

* * * * *